United States Patent Office 3,447,349
Patented June 3, 1969

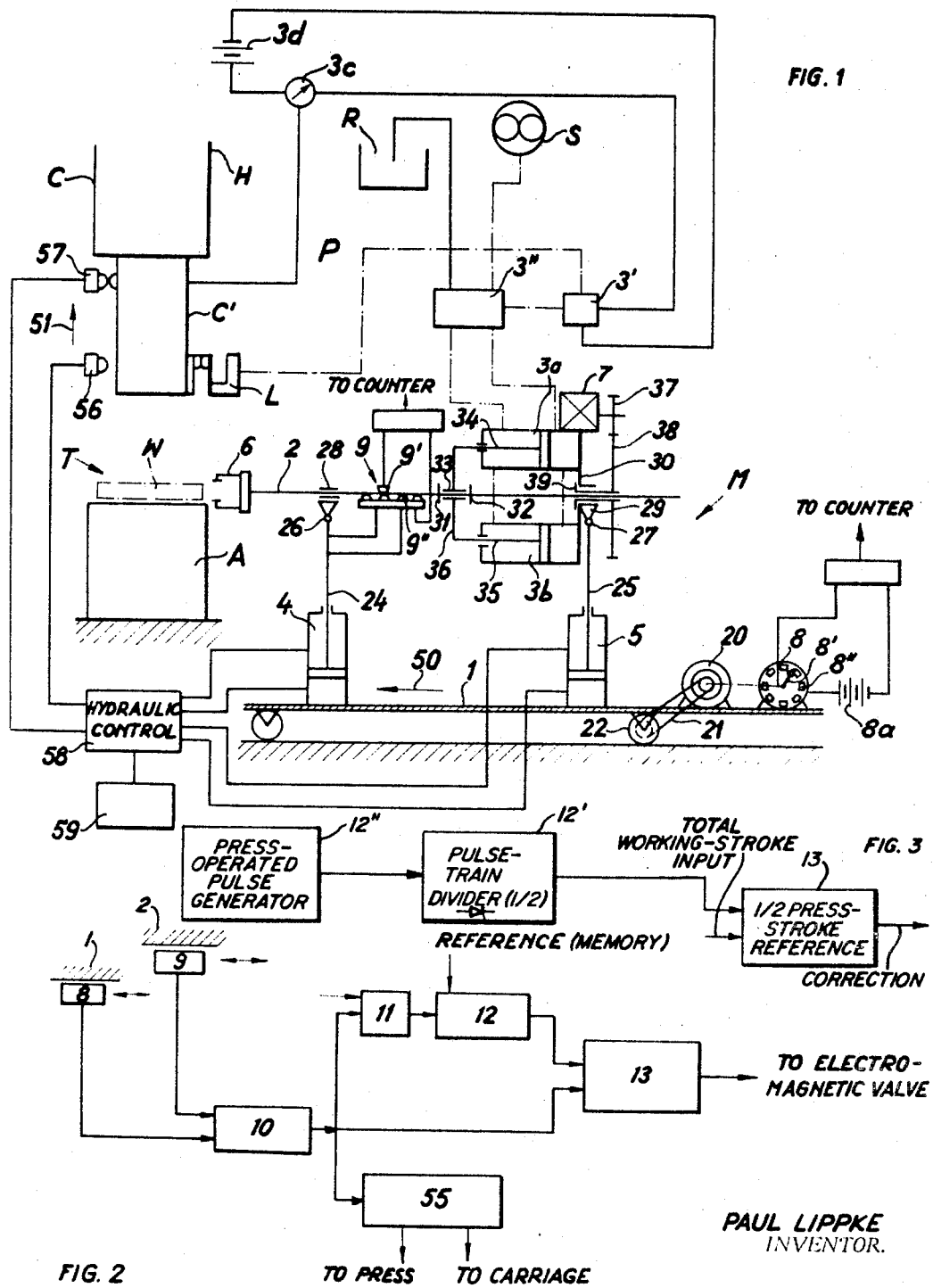

3,447,349
METHOD OF AND SYSTEM FOR OPERATING A HIGH-SPEED FORGING PRESS
Paul Lippke, Augustastrasse 17,
Neuwied (Rhine), Germany
Filed Aug. 2, 1965, Ser. No. 476,517
Int. Cl. B21d 22/00
U.S. Cl. 72—21          13 Claims

ABSTRACT OF THE DISCLOSURE

A method of and system for operating a high-speed forging press in which a carriage carrying the manipulating tongs is advanced continuously toward the press while the manipulator and carriage move relatively and intermittently in accordance with the press stroke as determined by a digital control of the manipulator movement so that during the working stroke of the press, the workpiece is immobilized but the manipulator is thereafter advanced to maintain the constant-rate movement of the carriage. Control is effected by means of a counter responsive both to the incremental movement of the carriage and the manipulator and triggered by pulses obtained from the ram. Hydraulic means on the carriage lays the workpiece on the anvil of the press and thereafter raises it therefrom.

---

My present invention relates to a method of operating a high-speed forging-press installation and an improved system for carrying out this method.

In general, a forging-press installation comprises a rapidly operating forging press whose plunger, ram or hammer is reciprocated rapidly toward and away from the anvil or bed of the press, while a "manipulator" serves to feed the workpiece progressively into the throat or forging zone of the press, to remove the workpiece, and to rotate the latter between the press strokes. Such manipulators generally comprise a pair of tongs or like clamping means engageable with the workpiece and mounted upon a carriage shiftable relatively to the press. Effective operation of the press requires that the cycling rate or cadence of the latter (in terms of number of strokes per unit time) be limited by the operating speed of the service installation, namely, the manipulator. For example, a press-cycle rate of 80 strokes per minute requires that the entire manipulator assembly of a conventional system be accelerated and braked to standstill (for the working strokes) in a period of less than 0.5 second with a travel of substantially 100 to 300 mm. It will thus be evident that the operating speed of the massive manipulator determines the limits of the cycling rate of the press.

Moreover, the operation of the manipulator independently of the press cadence permits some portion of the stroke cycle of the latter to be wasted and necessitates a greater number of reheatings of the workpiece by comparison with systems in which the manipulator movement is synchronized with the press. It will also be evident that nonsynchronous operation increases the treatment time and decreases the overall efficiency of the system.

It is, therefore, an important object of the present invention to provide an improved method of operating a forging press and manipulator assembly in a synchronous manner.

A more specific object of this invention is to provide a method of operating a high-speed forging press so as to decrease the length of time necessary for the shaping of a workpiece and, thereby reduce the number of workpiece heatings required for the forging operation.

Still another object of my invention is to provide a control system, in a press installation, which enables the movement of the workpiece manipulator to be co-ordinated effectively with the press.

These objects and others which will become apparent hereinafter are attainable in accordance with the present invention in a press-operating system in which acceleration and deceleration of the entire manipulator carriage for each incremental advance of the workpiece is dispensed with and the carriage is operated substantially continuously even during the working stroke of the press. More specifically I have found that high-rate forging of a workpiece can be carried out in a press installation wherein the workpiece is carried by a manipulator having a carriage displaceable substantially continuously at a speed corresponding to the desired mean rate of advance of the workpiece, and the workpiece (together with the retaining means or tongs therefor) is shiftable relatively to this carriage to develop the net movement of the workpiece. Assuming, therefore, a press-return stroke $t_1$, an advancing stroke occuping the period $t_2$ and a working period $t_3$ wherein the ram engages the workpiece, it may be stated that the mean rate or speed (V) of advance of the manipulator carriage can be defined $d/t$ where $d$ is the period of reciprocation of the ram and is equal to $t_1+t_2+t_3$. At least during the period $t_3$, however, the workpiece remains stationary because of its engagement by the forming members of the press. Accordingly, it is an important feature of the present invention to provide means on the carriage for incrementally advancing the workpiece relatively thereto by the stroke distance lost during the temporary immobilization of the workpiece or for shifting the workpiece ahead of the carriage relative to the press.

Thus the method of operating the installation of the present invention can be considered to involve, essentially, the steps of continuously displacing the carriage toward the forging zone of the press with the afore-described mean speed; intermittently shifting the workpiece-retaining means and the workpiece relatively to the carriage upon substantially each movement of the ram away from the anvil by a distance sufficient to permit the advance of the workpiece between the ram and the anvil; and immobilizing the tongs, while continuing the displacement of the carriage at this mean speed, during at least part of each working stroke of the ram in which the workpiece is engaged thereby. The intermittent shifting of the workpiece-retaining means by the fluid-responsive means, (e.g. a pneumatic or hydraulic piston-and-cylinder arrangement) on the carriage can be triggered by a signal generated by the ram of the press, with which suitable contact or switch means can co-operate for this purpose; the "pulse" is then developed when the ram has been displaced through the distance necessary to permit advance of the workpiece. The term "pulse" as used above is intended to include momentary signals as well as electrical signals or interruptions thereof which extend over the entire duration of the intermittent movement of the workpiece; this term is used in view of the fact that, at a high rate of press operation (e.g. 80 strokes per minute or higher), the switching of an electromagnetic valve to admit fluid to the power means for displacing the tongs on the carriage can be considered relatively momentary.

Advantageously, the substantially unimpeded movement of the carriage during immobilization of the workpiece between the ram and the anvil of the press is effected by shifting the electromagnetic valve into a position in which substantially unimpeded flow of fluid is permitted from the pressure chamber of the cylinder member. While either the cylinder member or the piston member can operatively engage the shaft, I prefer to have the cylinder means mounted upon the shaft-support structure which should include means for rotating the shaft and thereby turning the workpiece as required for usual forging operations. Thus, while the carriage is provided with power means continuously operable for advancing the carriage with respect to the press, the power means for axially displacing the shaft on the one hand and rotating the shaft on the other, are intermittently operable.

According to another feature of this invention, the carriage is provided with means operable in the cadence of the press for lifting the workpiece (via the tongs and shaft) from the anvil through a distance sufficient to permit underformed successive workpiece portions to clear the anvil and/or permit rotation of the workpiece. The control means can then include a switch means operable by the ram during its "up" or return stroke for liftting the workpiece and a further switch means operable upon the passage of the ram into its "down" or working stroke for triggering the descent of the workpiece.

The above and other objects, features and advantages of the present invention will become more readily apparent from the following description reference being made to the accompanying drawing in which, FIG. 1 shows somewhat diagrammatically a press assembly according to the present invention; and FIGS. 2 and 3 are circuit diagrams in block form illustrating features of the control system of the present invention.

Referring now to FIG. 1 of the drawing, it will be seen that the manipulator M, according to the present invention, comprises a carriage 1 which is substantially continuously displaceable by a servomotor 20 or a continuous-drive power means as will be evident from the following discussion. A belt or chain 21 couples the motor 20 with the wheels 22 of the carriage 1 which can be guided upon rails or other track means not illustrated. The carriage 1 supports a pair of fluid-responsive cylinders 4, 5 whose pistons 24, 25 are pivotally connected at 26, 27 with respective sleeves 28, 29 in which the shaft 2 is axially shiftable. Shaft 2 carries a pair of damping tongs 6 in which the workpiece can be engaged, the tongs being actuatable to take up and release the workpiece by any conventional means already proposed for this purpose. The shaft 2 is, moreover, rotatable within a housing 30 upon which a pair of fluid-responsive cylinders 3a, 3b are mounted with angular spacing about the shaft. The shaft 2 is rigid with a pair of shoulders 31, 32 forming abutments for a sleeve 33 to which the pistons 34, 35 of cylinders 3a, 3b are secured by a bar 36. The intermittent swinging movement of the shaft 2 through 180° is effected by a motor 7 whose pinion 37 meshes with a gear 38 carried by a sleeve 39; the latter is splined or keyed to the shaft 2 so as to be rotatable therewith but axially shiftable relatively thereto. Sleeve 39 is, moreover, journaled within the housing 30 which, in turn, is carried by the sleeve 29.

The axial movement of tongs 6 is so effected that the carriage 1 is displaced at a control mean speed via the motor 20 while the shaft 2, carrying the tongs 6, is shiftable relatively to the carriage within the sleeves 27 and 28. Thus, during the workpiece-engaging period of the press, the workpiece can be held stationary while movement of the carriage 1 continues.

For this purpose, the cylinders 3a and 3b are provided with electromagnetically operable (e.g. solenoid) valve means 3' associated with a valve 3" interposed between the source S of hydraulic pressure and the cylinders 3a, 3b. The electromagnetic valve 3' is operated via a control circuit which includes a pressure-sensitive switch 3c in circuit with an electric-current source 3d. Switch 3c is connected in the hydraulic-supply network H of the cylinder C of the forging press P whose piston C' is coupled with the press ram; the press, of course, may also be of the drop hammer, toggle or pneumatic type. When the pressure in the hydraulic network H rises sharply, thereby providing an indication of the engagement of the workpiece by the ram of the press, switch 3c is triggered to operate the electromagnetic valve means 3', 3" and bypass the flow of hydraulic fluid from the source S to the reservoir R while permitting fluid to flow freely from the latter into the working chambers on both sides of the pistons 34, 35 or to flow between these chambers unimpeded. Thus the workpiece, tongs 6 and shaft 2 can be immobilized relative to the press while the housing 30 and the carriage 1 continue their advance as determined by motor 20, 21.

In general, the installation is operated as follows:

The carriage 1 is set in motion in the direction of the press P (arrow 50) at a constant speed V equal to the quotient of the desired incremental advance $d$ of the workpiece per stroke of the press and the period $t$ required for this stroke. On a larger scale, therefore, the average speed of the carriage will be seen to be determined by the relationship $$\overline{V}=\frac{\sum\limits_{n}^{n}di}{\sum\limits_{n}ti}$$

wherein the incremental distance $di$ are summed over the total number of advances $n$ or press strokes required to forge a predetermined length of stock. The total time required for the foregoing operation is thus the sum $n/(\Sigma ti)$ of the incremental times $ti$ corresponding to the individual stroke times which may vary from increment to increment or may be constant. The press cadence or operating rate $r$ is thus defined by the relationship $r=n/\Sigma ti$. The synchronous incremental movement of the workpiece can be effected via a limit switch L or other contact means co-operating with the ram C of the press during each return stroke. The switch L is thus operated whenever the ram C' is withdrawn (arrow 51) from the anvil A of the press P by a distance sufficient to permit the workpiece W carried by the tongs 6 to be shifted within the throat T of the press. Contact means L energize the electromagnetic-valve means 3', 3" so that hydraulic fluid is forced from the pump S into the chambers of cylinders 3a, 3b to the right of their pistons and the workpiece is advanced through an incremental distance determined by the duration of the press stroke and the speed of the workpiece or, preferably in the manner described below. During the workpiece-engaging portion of the stroke of the ram or hammer the workpiece is immobilized and displacement of the carriage 1 continues with fluid being forced from the chambers to the right of the piston 34 and 35 to restore approximately the original position of the workpiece-retaining means 2, 6 etc. relative to the carriage 1.

The termination of the movement of the shaft 2 with its tongs 6 and the carriage 1 for each stroke may be effected by a digital control system diagrammatically illustrated in FIG. 2. Each of the moving elements, i.e. carriage 1 and shaft 2 is provided with a respective impulse generator adapted to produce a train of pulses each representative of an increment of movement of the respective member; for the purposes of the present invention, each pulse of the respective pulse train can represent a millimeter of actual advance of the carriage 1 or the shaft 2. The pulse generator 8 of the carriage 1 can be a rotary switch having a wiper 8' adapted to sweep a plurality of spaced-apart contacts 8" connected in parallel with one terminal of a constant level source 8a while the other terminal of the source and the wiper lead constitute one input to a counter 10. The other pulse generator 9 may have a linearly slidable wiper 9' successively engageable with contacts 9" and connected to counter 10 (FIG. 2). Thus the differential sum of the pulses operated at 8 and 9 represent the absolute displacement of the carriage 1, while the pulses of generator 9 alone represent the relative displacement of the shaft 2 with respect to the carriage; the summing counter 10 will develop an output signal or pulse train proportional to the absolute position of the tongs 6 and the workpiece with respect to the press.

The average speed $\overline{V}$ selected for the carriage 1 can, according to the present invention, be adjusted at each stroke of the press by the generation of an error signal proportional to the quotient $e_c = s/d$ where $e_c$ represents the error value for regulation of the carriage speed $\overline{V}$, S represents the desired stroke or distance of movement of the workpiece and $di$ represents the actual workpiece movement during the previous press cycle.

During the return stroke of the press, the carriage advances together with the workpiece over the predetermined distance and, at the conclusion of this displacement, a signal voltage is developed by, for example, a potentiometer or other servoposition-measuring device, the magnitude of this voltage being the analog of the position of the carriage. To determine whether the speed of the carriage is correct, one makes use of the quotient of the difference in displacement (as measured by the change in the analog voltage) and the duration of the previous press stroke. At the end of the desired displacement of the workpiece and forging length, a limit switch or the like can terminate further advance of the system. A similar result can be obtained by electronic switch means (e.g. 55) responsive to the total count in the summing unit 10. Thus unit 55 can cut off further operation of press and carriage when the desired count in unit 10 is obtained.

As will be apparent from FIG. 2, the control system includes a gate 11 between the output of the counter 10 and a further counter 12; the latter supplies the reference count to a differential counter 13 which, in turn, negatives the effect of switch L and operates the electromagnetic valve 3', 3" to terminate further movement of the workpiece relative to the carriage. The reference count can be applied to the counter 12 directly when different incremental movements $di$ of the workpiece are required during each stroke, the appropriate pulse trains being then derived from a memory or programming system or from a divider as described below. More generally, however, the immobilization of the workpiece and the continued displacement of the carriage 1 can trigger the gate 11 to permit the registration of pulses from the counter 10 into the counter 12 as the carriage overtakes the workpiece and restores the tongs 6 relative to the carriage. Counter 12 thus contains a count indicative of the displacement $di$ of the workpiece during the previous press stroke, this count serving as the reference for differential counter 13 which terminates the operation of the hydraulic means $3a$, $3b$ after the predetermined desired displacement of workpiece and carriage for each stroke.

According to a modification of the present invention (FIG. 3), at the commencement of forging, the working stroke and the return stroke of the press are established by suitable adjustment. The sum of the working-stroke time $(t_2 + t_3)$ and the return stroke $(t_1)$ defines the total period of each stroke. The stroke period of the tongs of the manipulator is half the press stroke and, by means of a divider 12', the pulse train representing the press stroke (from generator 12") can be halved to yield the pulse count constituting the reference value with which the counter 13 is supplied. When the pulses produced by the generators (e.g. 8, 9) defining the absolute position of the workpiece (and derived from counter 10 as previously described) agree with the reference pulse train, the stroke of the manipulator shaft is termined while the ram of the press has only traveled half of the distance required for the commencement of the necessary operating cycle. In this case, the speeds of the shaft and the carriage are identical; this reference pulse train can also be used to step the shaft and drive the carriage however.

According to a further feature of this invention, the ram C' is provided with contacts 56 and 57 coupled to a hydraulic control 58 for the cylinders 4 and 5. As the ram C' rises, contacts 56 are closed to operate the hydraulic control 58 when sufficient clearance is established within the throat of the press. Hydraulic fluid can then be supplied either to cylinder 4 alone or to cylinders 4 and 5 below the respective pistons 24 and 25 to raise the shaft 2, the tongs 6 and the workpiece W. The cylinders $3a$ and $3b$ is then energized to permit the workpiece to be advanced and motor 7 can be energized to permit rotation thereof. During the transition from the return stroke to the working stroke, contacts 57 are closed to operate the hydraulic control 58 and lower the workpiece W onto the anvil A. It is a feature of this invention, however, that the shaft 2 need not remain horizontal during the stroke. Merely by locking one of the cylinders 4 and 5 in a predetermined position of their pistons 24, 25 by a pressure-controlling means represented at 59, it is possible to bring the workpiece W to rest without pressure upon the anvil. In the illustrated system, the cylinder 5 has its piston 25 locked in position by the means 59 while switch 57 connects both chambers of cylinder 4 together so that piston 24 is floatingly displaced therein. As long as there is an inclination of the shaft 2 to the press, the difference between the extensions of the pistons 24 and 25 from their cylinders, permits the piston 24 cylinder 4 to follow the deformation. When the body has been sufficiently deformed so that the shaft 2 is again horizontal, both cylinders are charged with fluid for parallel operation as previously indicated. This arrangement is particularly suitable for the forging of tapered billets and blooms into bodies having parallel faces.

The invention described and illustrated is believed to admit of many modifications within the ability of persons skilled in the art, all such modifications being considered within the spirit and scope of the appended claims.

I claim:

1. In a method of operating a forging-press installation wherein successive portions of a workpiece are advanced by a manipulator between the reciprocable forging ram and an anvil of a forging press, the workpiece being held by workpiece-retaining means of the manipulator on a carriage thereof shiftable toward the forging zone of the press, the improvement which comprises the steps of:

(a) continuously displacing said carriage toward said zone with a mean speed $\overline{V} \approx d/t$, where $d$ is equal substantially to the incremental advance of the workpiece required for successive press strokes and $t$ is equal substantially to the period of reciprocation of the ram;

(b) intermittently shifting said workpiece-retaining means and the workpiece carried thereby relatively to said carriage upon substantially each movement of said ram away from said anvil by a distance sufficient to permit advance of said workpiece between said ram and said anvil;

(c) immobilizing said workpiece-retaining means and said workpiece with respect to said press at least during the part of each working stroke of said ram in which said ram engages said workpiece while continuing the displacement of said carriage at said speed; and (d) generating a signal pulse during each movement of said ram away from said anvil to said distance therefrom, and triggering said intermittent shifting of said workpiece-retaining means in step (b) with the signal pulses thus generated.

2. The method defined in claim 1 wherein said installation comprises fluid-responsive means on said carriage for intermittently shifting said workpiece-retaining means relatively to said carriage, said fluid-responsive means including a cylinder and a piston reciprocable in said cylinder, said improvement further comprising the steps of supplying fluid under pressure to a chamber of said cylinder to displace said piston relatively thereto during the intermittent shifting of said workpiece-retaining means in step (b), and terminating the supplying of fluid under pressure to said chamber during the immobilization of said workpiece in step (c) while permitting substantially unimpeded flow of fluid from said chamber during the continued displacement of said carriage at said speed.

3. In a method of operating a forging-press installation wherein successive portions of a workpiece are advanced by a manipulator between the reciprocable forging ram and an anvil of a forging press, the workpiece being held by workpiece-retaining means of the manipulator on a carriage thereof shiftable toward the forging zone of the press, the improvement which comprises the steps of:
 (a) continuously displacing said carriage toward said zone with a mean speed $\overline{V} \approx d/t$, where $d$ is equal substantially to the incremental advance of the workpiece required for successive press strokes and $t$ is equal substantially to the period of reciprocation of the ram;
 (b) intermittently shifting said workpiece-retaining means and the workpiece carried thereby relatively to said carriage upon substantially each movement of said ram away from said anvil by a distance sufficient to permit advance of said workpiece between said ram and said anvil;
 (c) immobilizing said workpiece-retaining means and said workpiece with respect to said press at least during the part of each working stroke of said ram in which said ram engages said workpiece while continuing the displacement of said carriage at said speed; and
 (d) lifting said workpiece from said anvil to permit the shifting of said workpiece in step (b) and returning said workpiece to engagement with said anvil upon termination of the advance of said workpiece in the cadence of reciprocation of said ram.

4. The improvement defined in claim 3 wherein said workpiece is lifted through a distance sufficient to permit a successive undeformed portion of the workpiece, rearwardly of the portion of the workpiece deformed during the prior working stroke of the ram, to clear said anvil.

5. The improvement defined in claim 4, further comprising the steps of generating a first control signal upon displacement of said ram away from said anvil and a second control signal upon transformation of the movement of said ram into the working stroke, and triggering said lifting of said workpiece from said anvil and the return of said workpiece to engagement with said anvil with said first and second control signals, respectively.

6. In a method of operating a forging-press installation wherein successive portions of a workpiece are advanced by a manipulator between the reciprocable forging ram and an anvil of a forging press, the workpiece being held by workpiece-retaining means of the manipulator on a carriage thereof shiftable toward the forging zone of the press, the improvement which comprises the steps of:
 (a) continuously displacing said carriage toward said zone with a means speed $\overline{V} \approx d/t$, where $d$ is equal substantially to the incremental advance of the workpiece required for successive press strokes and $t$ is equal substantially to the period of reciprocation of the ram;
 (b) intermittently shifting said workpiece-retaining means and the workpiece carried thereby relatively to said carriage upon substantially each movement of said ram away from said anvil by a distance sufficient to permit advance of said workpiece between said ram and said anvil;
 (c) immobilizing said workpiece-retaining means and said workpiece with respect to said press at least during the part of each working stroke of said ram in which said ram engages said workpiece while continuing the displacement of said carriage at said speed, and
 (d) generating a series of first indicator pulses representing incremental advances of said workpiece-retaining means relatively to said carriage, a series of second indicator pulses representing incremental movements of said carriage toward said zone, counting at least said first indicator pulses, and immobilizing said workpiece-retaining means in step (c) upon the count of said indicator pulses attaining a predetermined value.

7. The improvement defined in claim 6, further comprising the step of counting at least said second indicator pulse and terminating the advance of said carriage upon the count with said second indicator pulses attaining a predetermined value.

8. The improvement defined in claim 7, further comprising the steps of adding first and second indicator pulses and controlling the movement of said carriage in accordance with the sum thus obtained.

9. A forging-press installation comprising:
 (a) a fixedly positioned forging press having an anvil and a ram reciprocable toward and away from said anvil for the forging of a workpiece between said ram and said anvil;
 (b) a manipulator for said workpiece shiftable relatively to said press for advancing successive portions of said workpiece between the anvil and ram thereof, said manipulator having a carriage displaceable in the direction of said press, workpiece-retaining means mounted on said carriage for displacement relatively thereto toward said press, and means on said carriage for shifting said workpiece-retaining means relatively to said carriage;
 (c) control means responsive to the operation of said press and regulating said workpiece-retaining means and said carriage for:
  (1) continuously displacing said carriage toward said zone with a mean speed $\overline{V} \approx d/t$ where $d$ is equal substantially to the incremental advance of the workpiece required for successive press strokes and $t$ is equal substantially to the period of reciprocation of said ram;
  (2) intermittently shifting said workpiece-retaining means relatively to said carriage upon substantially each movement of said ram away from said anvil by a displacement sufficient to permit advance of said workpiece between said ram and said anvil;
  (3) immobilizing said workpiece-retaining means and said workpiece with respect to said press at least during the part of each working stroke of said ram in which said ram engages said workpiece; and
  (4) continuing the displacement with said carriage at said speed while said workpiece-retaining means is immobilized with respect to said press; and
 (d) means on said carriage for shifting said workpiece in a direction perpendicular to said shaft for lifting said workpiece away from said anvil and returning said workpiece to engagement with said anvil in the cadence of reciprocation of said ram, said workpiece-retaining means including a pair of tongs engageable with the workpiece, and shaft rotatably mounted upon said carriage and axially shiftable relatively thereto toward and away from said press, said further means including fluid-pressure responsive means having a cylinder member and a piston member displaceable within said cylinder member, one of said members engaging said shaft and the other of said members being connected with said carriage for shifting said shaft relatively to said carriage upon energization of a chamber of said cylinder member with fluid under pressure, said control means including electromagnetically operable valve means, connected with said cylinder member for admitting fluid under pressure thereto, and contact means co-operating with said ram and in circuit with said valve means for energizing said valve means upon each movement with said ram away from said anvil to said distance therefrom and thereby admitting fluid to said chamber under pressure for shifting said tongs relatively to said carriage.

10. An installation as defined in claim 9 further comprising means for rotating said workpiece-retaining means about the axis of said shaft.

11. A forging-press installation comprising:
  (a) a fixedly positioned forging press having an anvil and a ram reciprocable toward and away from said anvil for the forging of a workpiece between said ram and said anvil;
  (b) a manipulator for said workpiece shiftable relatively to said press for advancing successive portions of said workpiece between the anvil and ram thereof, said manipulator having a carriage displaceable in the direction of said press, workpiece-retaining means mounted on said carriage for displacement relatively thereto toward said press, and means on said carriage for shifting said workpiece-retaining means relatively to said carriage;
  (c) control means responsive to the operation of said press and regulating said workpiece-retaining means and said carriage for:
    (1) continuously displacing said carriage toward said zone with a mean speed $\overline{V} \approx d/t$ where $d$ is equal substantially to the incremental advance of the workpiece required for successive press strokes and $t$ is equal subtantially to the period of reciprocation of said ram;
    (2) intermittently shifting said workpiece-retaining means relatively to said carriage upon substantially each movement of said ram away from said anvil by a displacement sufficient to permit advance of said workpiece between said ram and said anvil;
    (3) immobilizing said workpiece-retaining means and said workpiece with respect to said press at least during the part of each working stroke of said ram in which said ram engages said workpiece, and
    (4) continuing the displacement with said carriage at said speed while said workpiece-retaining means is immobilized with respect to said press; and
  (d) first signal-generator means operatively connected with said workpiece-retaining means for producing a series of first indicator pulses representative of incremental advances of said workpiece-retaining means relative to said carriage, and second signal-generating means operatively connected with said carriage for producing a series of second indicator pulses representing incremental movements of said carriage toward said press, said control means further comprising pulse-adding means for said first and second indicator pulses for development of a signal indicative of the absolute position of said workpiece relatively to said press and means for terminating the forging of said workpiece upon said absolute position coinciding with a predetermined absolute position of the workpiece.

12. An installation as defined in claim 11 wherein said control means includes a differential counter supplied with said signal and with a pulse train representative of the total desired length of forging of said workpiece, said control means immobilizing said carriage and terminating forging of said workpiece upon coincidence in said differential counter.

13. In a forging-press installation, a manipulator for a workpiece comprising:
  (a) a carriage shiftable toward and away from the press;
  (b) first power means on said carriage for substantially continuously displacing same;
  (c) workpiece-retaining means mounted upon said carriage and including a shaft axially displaceable thereon, and a pair of tongs carried by said shaft and engageable with a workpiece for inserting same between the ram and anvil of a forging press;
  (d) second power means on said carriage operatively connected with said shaft for intermittently shifting said shaft and said tongs relatively to said carriage;
  (e) means on said carriage for rotating said shaft about its axis to rotate the tongs and workpiece carried thereby; and
  (f) means on said carriage rotatably supporting said shaft and provided with third power means for displacing said shaft and the workpiece carried thereby in a direction perpendicular to the axis of said shaft, thereby enabling said workpiece to be lifted from said anvil and returned thereto after advance of said workpiece between the ram and anvil of a press.

References Cited
UNITED STATES PATENTS

| 3,267,708 | 8/1966 | Sims | 72—421 |
| 3,274,819 | 9/1966 | Knowles | 72—421 |
| 3,285,044 | 11/1966 | Gregson | 72—421 |

CHARLES W. LANHAM, *Primary Examiner.*

G. P. CROSBY, *Assistant Examiner.*

U.S. Cl. X.R.

72—421